(12) United States Patent
Sayag

(10) Patent No.: US 7,929,220 B2
(45) Date of Patent: Apr. 19, 2011

(54) ADJUSTABLE APODIZED LENS APERTURE

(76) Inventor: Michel Sayag, Mountain View, CA (US)

( * ) Notice: Subject to any disclaimer, the term of this patent is extended or adjusted under 35 U.S.C. 154(b) by 0 days.

(21) Appl. No.: 12/582,586

(22) Filed: Oct. 20, 2009

(65) Prior Publication Data

US 2010/0039689 A1  Feb. 18, 2010

Related U.S. Application Data

(62) Division of application No. 11/612,091, filed on Dec. 18, 2006, now abandoned.

(60) Provisional application No. 60/753,242, filed on Dec. 21, 2005, provisional application No. 60/858,909, filed on Nov. 13, 2006.

(51) Int. Cl.
  *G02B 9/08* (2006.01)
  *G02F 1/03* (2006.01)
  *G02F 1/07* (2006.01)

(52) U.S. Cl. ........................ 359/738; 359/241

(58) Field of Classification Search .................. 359/241, 359/738

See application file for complete search history.

(56) References Cited

U.S. PATENT DOCUMENTS

| | | | |
|---|---|---|---|
| 3,217,596 A | 11/1965 | Murray et al. | |
| 3,514,186 A | 5/1970 | Poncelet | |
| 4,030,817 A | 6/1977 | Westell | |
| 4,332,039 A | 6/1982 | Lafuente | |
| 4,687,285 A | 8/1987 | Hily et al. | |
| 4,727,457 A | 2/1988 | Thillays | |
| 4,889,409 A | 12/1989 | Atcheson | |
| 5,108,427 A | 4/1992 | Majercik et al. | |
| 5,166,830 A | 11/1992 | Otsu et al. | |
| 5,323,268 A | 6/1994 | Kikuchi | |
| 5,373,392 A | 12/1994 | Bala | |
| 5,424,531 A | 6/1995 | Denyer et al. | |
| 5,691,548 A | 11/1997 | Akio | |
| 5,708,522 A | 1/1998 | Levy | |
| 5,801,681 A | 9/1998 | Sayag | |
| 5,851,328 A | 12/1998 | Kohan | |
| 5,905,561 A | 5/1999 | Lee | |
| 6,139,577 A | 10/2000 | Schleipman et al. | |
| 6,224,210 B1 | 5/2001 | Chateau et al. | |
| 6,391,057 B1 | 5/2002 | Schleipman et al. | |
| 6,621,616 B1 | 9/2003 | Bauer et al. | |
| 6,657,171 B1 | 12/2003 | Huynh et al. | |
| 6,747,805 B2 | 6/2004 | Sayag | |
| 6,786,598 B2 | 9/2004 | Buazza | |

(Continued)

FOREIGN PATENT DOCUMENTS

JP  06 317815  11/1994

(Continued)

OTHER PUBLICATIONS

Extended European Search Report, EP App No. 06847854.4-2217 dated Feb. 5, 2010.

(Continued)

*Primary Examiner* — William C Choi

(74) *Attorney, Agent, or Firm* — Weaver Austin Villeneuve and Sampson LLP

(57) ABSTRACT

An adjustable apodized lens aperture is described which is constructed using photochromic material. As the excitation energy increases, the aperture constricts so as reduce the amount of light through the aperture. As the excitation energy decreases, the aperture dilates so as increase the amount of light through the aperture.

35 Claims, 15 Drawing Sheets

U.S. PATENT DOCUMENTS

| | | |
|---|---|---|
| 6,950,242 B2 | 9/2005 | Sayag |
| 7,245,347 B2 | 7/2007 | Lundgren |
| 2001/0050721 A1 | 12/2001 | Miyake |
| 2003/0156213 A1 | 8/2003 | Doering et al. |
| 2004/0183965 A1 | 9/2004 | Lundgren |
| 2004/0188873 A1 | 9/2004 | Ono et al. |
| 2007/0258071 A1 | 11/2007 | Case et al. |

FOREIGN PATENT DOCUMENTS

| | | | |
|---|---|---|---|
| JP | 06317815 A | * | 11/1994 |
| JP | 09 203918 | | 8/1997 |
| WO | WO 92/15036 | | 9/1992 |
| WO | WO 96/34735 | | 11/1996 |

OTHER PUBLICATIONS

Office Action dated Sep. 25, 2003, U.S. Appl. No. 10/202,454.
Notice of Allowance dated Dec. 23, 2003, U.S. Appl. No. 10/202,454.
Notification of Transmittal of International Search Report dated Dec. 11, 2002.
European Examination Report dated Oct. 25, 2005, EP Application No. 02756598.5.
Supplementary Partial European Search Report dated Jul. 15, 2004, EP Application No. 02756598.5.
Supplementary Search Report dated Apr. 14, 2005, EP Application No. 02756598.5.
Japanese Office Action dated Oct. 7, 2008, JP Application No. 2003514322.
Korean Office Action dated May 23, 2008, KR Application No. 0880875.
Notice of Allowance dated May 5, 2005, U.S. Appl. No. 10/783,945.
Office Action dated Jul. 23, 2009, U.S. Appl. No. 11/612,091.
Notification Concerning Transmittal of International Preliminary Report on Patentability dated Jul. 3, 2008, PCT Application No. PCT/US2006/048668.
Notification of Transmittal of the International Search Report and the Written Opinion of the International Searching Authority dated Feb. 26, 2008, PCT Application No. PCT/US2006/048668.
Desag,Schott, Photosolar Supergrey, Mar. 7, 2000, pp. 1-12.

* cited by examiner

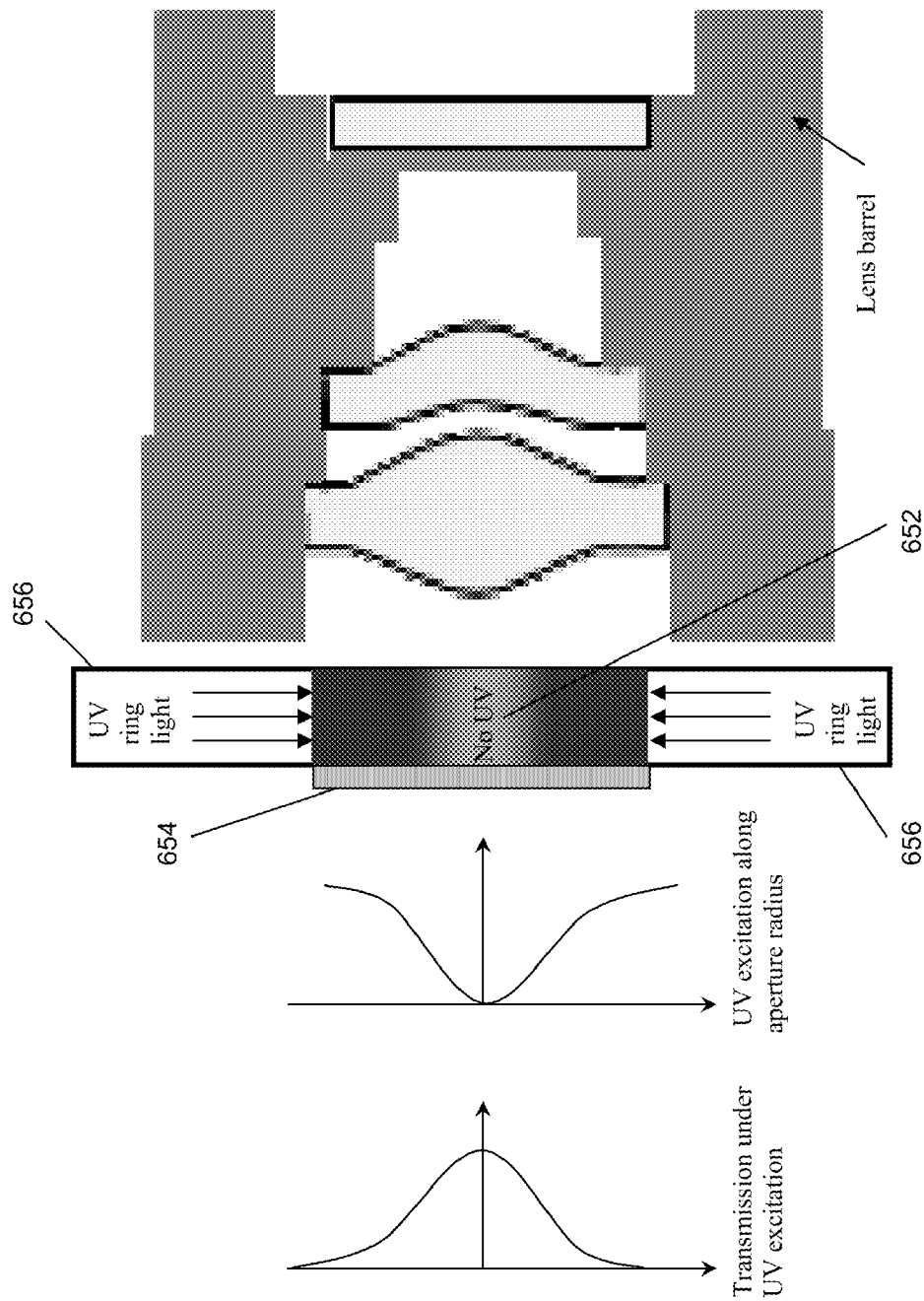

ns and pixels get smaller (5 μm in 2000, 2 μm in 2006) thus requiring a lens

ADJUSTABLE APODIZED LENS APERTURE

RELATED APPLICATION DATA

The present application is a divisional of and claims priority under 35 U.S.C. 120 to U.S. patent application Ser. No. 11/612,091 filed on Dec. 18, 2006, which claims priority under 35 U.S.C. 119(e) to U.S. Provisional Patent Application No. 60/753,242 filed on Dec. 21, 2005, and U.S. Provisional Patent Application No. 60/858,909 filed on Nov. 13, 2006, the entire disclosure of each of which is incorporated herein by reference for all purposes.

BACKGROUND OF THE INVENTION

The present invention relates to optical systems and, in particular, to adjustable apertures for camera lenses.

Since the early days of photography, camera manufacturers have given photographers access to critical adjustments in order to get correctly exposed pictures. These adjustments are commonly referred to by photographers as "shutter speed" (adjustable exposure time of the film), "film speed" (choice of film sensitivity), and lens aperture (adjustable diaphragm in the lens). In addition to affecting the film exposure, these adjustments also provide other essential benefits. For example, the shutter speed adjustment allows the photographer to freeze in time a fast moving scene. The film speed allows the photographer to get the desired grain in the image. The lens aperture adjustment allows the photographer to get the desired depth of field.

In digital cameras, the electronic shutter control (adjustable integration time of the image sensor) often replaces the mechanical shutter but does not eliminate the need for the lens aperture adjustment. Although the correct exposure can be achieved by adjusting the electronic shutter alone, the depth of field cannot be affected by it. Therefore the lens aperture adjustment remains an indispensable tool, not only to control the amount of light impinging on the imaging sensor but also to achieve the desired depth of field. The most common form of lens aperture adjustment is the mechanical iris diaphragm or mechanical iris. The mechanical iris consists of multiple blades which can be moved with respect to each other so as to form a pseudo-circular polygonal aperture; the larger the number of blades, the closer the polygonal aperture is to circular. The blades are often attached to an inner ring and an outer ring. The mechanical iris is opened and closed by turning the outer ring while holding the inner ring stationary. It is sometimes combined with a shutter mechanism. Lenses with a manual iris often bear markings corresponding to the diameter of the iris as a fraction of the lens focal length. This is commonly known as the f-number or f stop, e.g. f/5.6. FIG. 1 shows an example of an 8-blade mechanical iris with apertures ranging from f/1.4 to f/22.

Most film cameras and many digital cameras incorporate a mechanical iris or some other form of lens aperture adjustment (e.g., a rudimentary aperture wheel). However, there are some notable exceptions: disposable film cameras and very-low-cost digital cameras. The main reason for not using a lens aperture adjustment is cost. That is, mechanical irises can be as inexpensive as $1.50, which is very affordable in the design of a $300 digital camera but prohibitively expensive for a $4.50 camera module intended for computer or cellular telephone applications. In fact, almost all cellular telephone cameras (referred to in the industry as cell phone camera modules) do not include a lens aperture adjustment. Originally designed as gadgets rather than replacements for traditional cameras, cell phone camera modules were supposed to produce acceptable images in dim light conditions without a flash (e.g., inside a Karaoke bar). For this reason, they were fitted with lenses with a large fixed aperture (e.g., f/2.8, to maximize sensitivity at the expense of the depth of field), and relied on the electronic shutter to adjust the exposure level. The consequence was that they neither produced good quality images at low-light level (objectionable shot noise and read-out noise) nor at high-light level (poor depth of field and reduced sharpness due to lens aberrations).

Because of their enormous popularity (already outselling film and digital cameras), cell phone camera modules are now poised to replace traditional cameras. They need however to match traditional camera image quality at a fraction of the cost of a traditional camera. As unrealistic as it may seem, consumer expectation is that image quality from a $4.50 cell phone camera module should match the image quality from a $300 digital camera. Unfortunately, current cell phone camera modules are optimized for worst-case conditions (low light level imaging) and do not produce images with sufficient sharpness and depth of field, even under good illumination conditions such as outdoor imaging with adequate daylight.

This issue is further aggravated by price pressure and market demand for a larger number of pixels. As semiconductor technology progresses, image sensors get sharper (0.25 megapixels in 2000, 2 megapixels in 2006) and pixels get smaller (5 μm in 2000, 2 μm in 2006) thus requiring a lens with a wider aperture in order to maintain the same sensitivity. This requirement conflicts with the need for a sharper lens (since a wider aperture results in greater lens aberrations) and for an increased depth of field (since a wider aperture results in a reduced depth of field). Rather than solving the fundamental issue at hand (i.e. the need for an adjustable lens aperture), many lens and module manufacturers (as well as start-up companies) have spent millions of dollars trying to circumvent it. See, for example, the Oct. 2, 2006, Red Herring article entitled "Clearer Vision," the entire disclosure of which is incorporated herein by reference for all purposes.

The two most advertised "band-aid" solutions are the optical auto-focus using a "liquid lens" and the "phase-mask" approach using image processing algorithms. In the case of the optical auto-focus using a liquid lens, the depth of field is not increased. Rather, the focus is simply adjusted for a particular distance. In the case of the phase-mask approach, the focus of the lens is in fact degraded. A phase-mask (placed on one of the lens elements) introduces a relatively constant amount of defocus throughout an extended depth of field. The sharpness is then partially restored by digital means using image processing algorithms. Unfortunately, the sharpness restoration algorithms also introduce a significant amount of noise in the image.

It is clear that none of these solutions really eliminate the need for an adjustable lens aperture but there are no suitable technical implementations fulfilling this need. Current mechanical irises are too expensive, too bulky, too fragile, and too power-hungry to satisfy the expected one-billion cell phone camera module market. Mechanical irises also have another serious technical drawback: diffraction through their circular aperture significantly degrades the image sharpness for small aperture settings, e.g., high f numbers such as f/5.6 or higher.

SUMMARY OF THE INVENTION

According to the present invention, an optical element is provided including a photochromic material configured such that when the photochromic material is exposed to excitation energy an apodized aperture operable to transmit visible light through the optical element is formed. Variance of the excitation energy causes corresponding adjustment of the apodized aperture. Specific embodiments of the invention are contemplated in which such an optical element is embodied in lens systems and electronic devices incorporating lens systems such as, for example, cameras, and mobile devices which include cameras.

According to some embodiments, the apodized aperture is characterized by a Gaussian radial transmission curve.

According to one class of embodiments, the photochromic material includes a photochromic dye which is substantially uniformly distributed throughout the photochromic material, and a thickness of the photochromic material increases along a radius of the apodized aperture.

According to another class of embodiments, the photochromic material includes a photochromic dye which is distributed throughout the photochromic material such that an active concentration of the photochromic dye increases along a radius of the apodized aperture.

According to yet another class of embodiments, an ultraviolet (UV) blocking element is configured to inhibit UV energy from impinging on at least a portion of a front surface of the photochromic material through which the visible light reaches the apodized aperture. According to a subset of these embodiments, the UV blocking element has a transmission characteristic for UV energy which increases along a radius of the apodized aperture. According to another subset of these embodiments, the UV blocking element blocks substantially all UV energy from impinging on the front surface of the photochromic material.

According to some of the latter subset of these embodiments, the photochromic material includes a photochromic dye which is substantially uniformly distributed throughout the photochromic material, and wherein the photochromic material comprises a UV energy absorber, the optical element further comprising at least one excitation component configured to facilitate transmission of UV energy through an edge of the photochromic material, the UV energy absorber being operable to interact with the UV energy to define the apodized aperture. According to various specific ones of these embodiments, the UV energy absorber may comprise an additional material distinct from the photochromic dye, or the photochromic dye itself.

A further understanding of the nature and advantages of the present invention may be realized by reference to the remaining portions of the specification and the drawings.

BRIEF DESCRIPTION OF THE DRAWINGS

FIGS. 6a and 6b are edge-on views examples of adjustable apodized apertures designed in accordance with specific embodiments of the invention.

DETAILED DESCRIPTION OF SPECIFIC EMBODIMENTS

Figure 1:
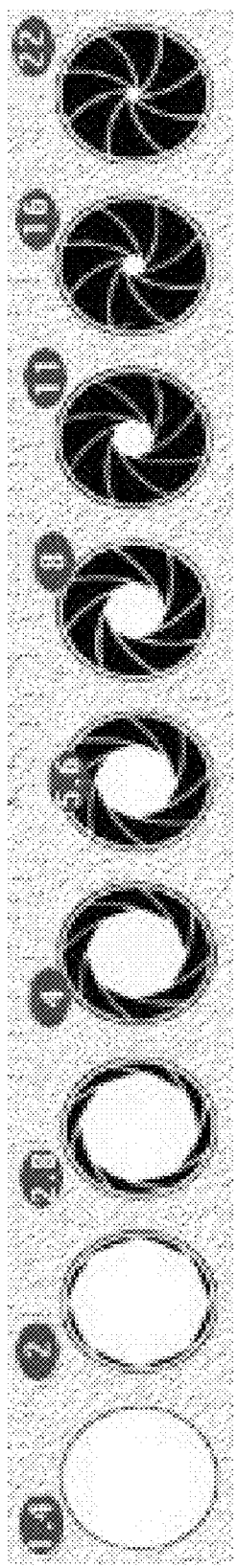
FIG. 1 is an illustration of the operation of a conventional mechanical iris.

Reference will now be made in detail to specific embodiments of the invention including the best modes contemplated by the inventor for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

As described in U.S. Pat. No. 6,747,805 and No. 6,950,242, an apodized pupil is created by using a light-absorbing material between a convex surface and a flat surface in contact with each other. As the thickness of the material increases, its light transmission decreases. Accordingly, the amount of light absorption by the material determines the effective aperture of the lens. The appropriate amount of light absorption creates an apodized pupil, as explained below.

An apodized pupil is a pupil for which transmission T varies along its radius x as a Gaussian curve, i.e., $T=\exp(-\alpha x^2)$. It is well known that the transmission T through a light-absorbing material is given by the equation $T=\exp(-\alpha d)$, where $\alpha$ is the absorption coefficient and d is the thickness of the light-absorbing material. The thickness of the material is the distance between the convex surface and the flat surface. This distance may be represented by the equation $d=x^2$, therefore the transmission $T=\exp(-\alpha x^2)$.

In the present disclosure, it is proposed to replace the light-absorbing material with a material for which transparency can change with either an applied voltage (electrochromic material) or simply with the ambient light (photochromic material). It is therefore possible to create a pupil similar to the pupil of the human eye, i.e. a pupil with automatic dilation and constriction.

According to various embodiments of the present invention, an adjustable apodized lens aperture is constructed using photochromic material. As used herein "photochromic material" refers to any material for which the absorption spectra undergoes reversible changes in response to absorption of, stimulation by, or excitation by light energy. As used herein, the term "apodized" and related terms (e.g., apodizing, apodization, etc.) refer to an aperture which has a gradual transition along its radius from full (at the center) to zero intensity of transmitted light (at the edges of the aperture). A perfectly apodized aperture is an aperture for which light transmission T varies along its radius x as a Gaussian curve, i.e., $T=\exp(-\alpha x^2)$.

It should be noted that, although the benefits of apodization have been known for some time (see, for example, Guy Lansraux, Revue d'Optique, v. 26, January-February 1947, p. 24-45), few lenses have had apodized apertures because of very challenging implementation difficulties, even for fixed (i.e., non-adjustable) apertures. Some implementations were based on partially reflective coatings (i.e., mirrored apertures) which would achieve gradual transition of light transmission along the aperture radius by reflecting back unwanted light rather than absorbing it. However, some of the reflected light could bounce inside the lens and find its way to the detector, causing undesirable effects. Other implementations were based on liquid crystal cells which would require a polarizer/analyzer to block light, thus cutting down the full aperture transmission to 50% or less, an unacceptable inefficiency for most camera lenses. The challenges of implementing an adjustable apodized aperture with the ability to provide near 100% transmission in its open state are multiple and have been addressed by embodiments of the present invention.

Specific embodiments emulate the pupil of the human eye in that they facilitate automatic dilation and constriction. As the excitation energy increases, the aperture constricts so as reduce the amount of light through the lens. The constricting aperture enabled by the present invention changes the effective f number of the lens system and therefore increases its depth of field. Similarly, as the excitation energy decreases, the aperture dilates so as increase the amount of light through the lens. As the material becomes completely transparent, the full aperture is limited only by the lens mechanical stop (assuming no other system elements are the limiting factor).

According to various embodiments, the photochromic material can be liquid, gel, or solid. It can be obtained by dissolving a photochromic dye in a host material. Photochromic dyes referred to herein are reversible dyes (as opposed to irreversible dyes). When sunlight or UV radiation is applied, the dye becomes excited and its molecular structure changes allowing its color or density to appear. In this context, "density" (i.e., optical density) refers to the "darkness" of an optical material, and is defined by the logarithm of the transmission. For example, a filter or a piece of exposed photographic film with an optical density of 3 signifies that the film has a 0.1% transmission. Devices known as densitometers can measure optical density. When the stimulus (sunlight/UV) is removed, the dye returns to a state of rest, i.e., its colorless form. Photochromic dyes which absorb light (i.e., rather than diffuse it) are preferred for this invention.

According to some embodiments, suitable photochromic dyes are neutral density dyes (e.g., gray dyes), although a combination of colored dyes could be used to achieve a neutral density aperture. In other embodiments, colored dyes could be used to achieve wavelength-dependent adjustable apertures. Suitable gray photochromic dyes are manufactured, for example, by Color Change Corporation of Streamwood, Ill., under the reference "gray 5" or "gray 2," and by PPG Industries, Inc., of Monroeville, Pa., under the reference "Photosol." And as will be understood, a wide variety of host materials may be used. For example, photochromic dyes can be used in various plastics such as PVC, PVB, PP, CAB, EVA, urethanes, and acrylics. In addition, photochromic dyes are soluble in most organic solvents.

It should be noted that embodiments are also contemplated which employ photochromic glass such as, for example, Photosolar® provided by Schott Glass of Duryea, Pa.

And because some photochromic materials are sensitive to ultraviolet (UV) light, embodiments of the invention are contemplated which employ an electrically-controllable aperture using a UV light source (e.g., a UV LED) instead of ambient light as an excitation source. According to such embodiments, adjusting the UV LED current (and therefore its brightness) effectively controls the lens aperture.

According to various embodiments of the invention, a variety of mechanisms and structures may be employed to facilitate an apodized light transmission distribution in a lens aperture. Three classes of embodiments are described below.

According to a first class of embodiments, an adjustable apodized lens aperture (also referred to as an adjustable apodization filter) is achieved by varying the thickness of a photochromic material. According to one implementation, such an aperture is created by filling the space between a substantially flat surface and a substantially convex surface in contact with each other with a photochromic material. As the thickness of the photochromic material increases (i.e., away from the point of contact), its light transmission decreases when it is in its excited state. Therefore, the amount of light (e.g., ambient or UV light) exciting the photochromic material determines the effective aperture of the optical system of which the photochromic material is a part. The appropriate amount of photochromic dye in the photochromic material and an adequate amount of excitation light are together able to create a nearly perfectly apodized aperture.

Figure 2C:
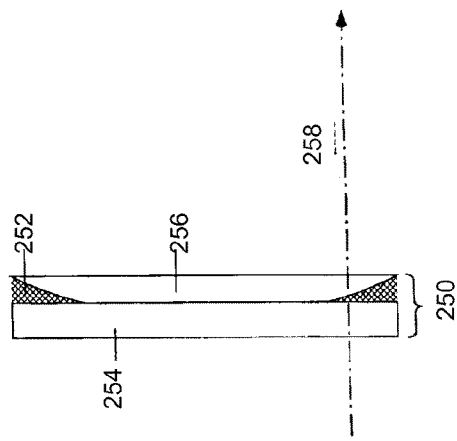
FIG. 2a-2c are edge-on views of examples of adjustable apodized apertures designed in accordance with specific embodiments of the invention.
Figure 2B:
Figure 2A:
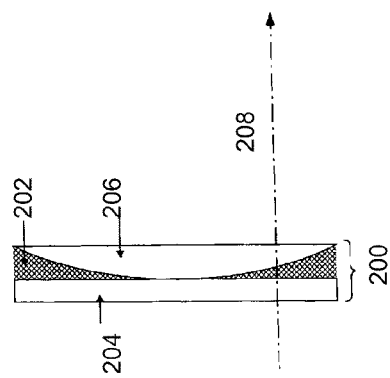

According to the embodiment depicted in FIG. 2a, the thickness of photochromic material 202 is defined by the distance between the flat surface of element 204 and the convex surface of element 206. If the convex surface is spherical, this distance can be approximated by the equation $d=x^2$. Assuming that the transmission T through the photochromic material is given by the equation $T=\exp(-\alpha d)$, where $\alpha$ is the absorption coefficient and d is the thickness of the photochromic material, the transmission can therefore be expressed as $T=\exp(-\alpha x^2)$.

Figure 3:
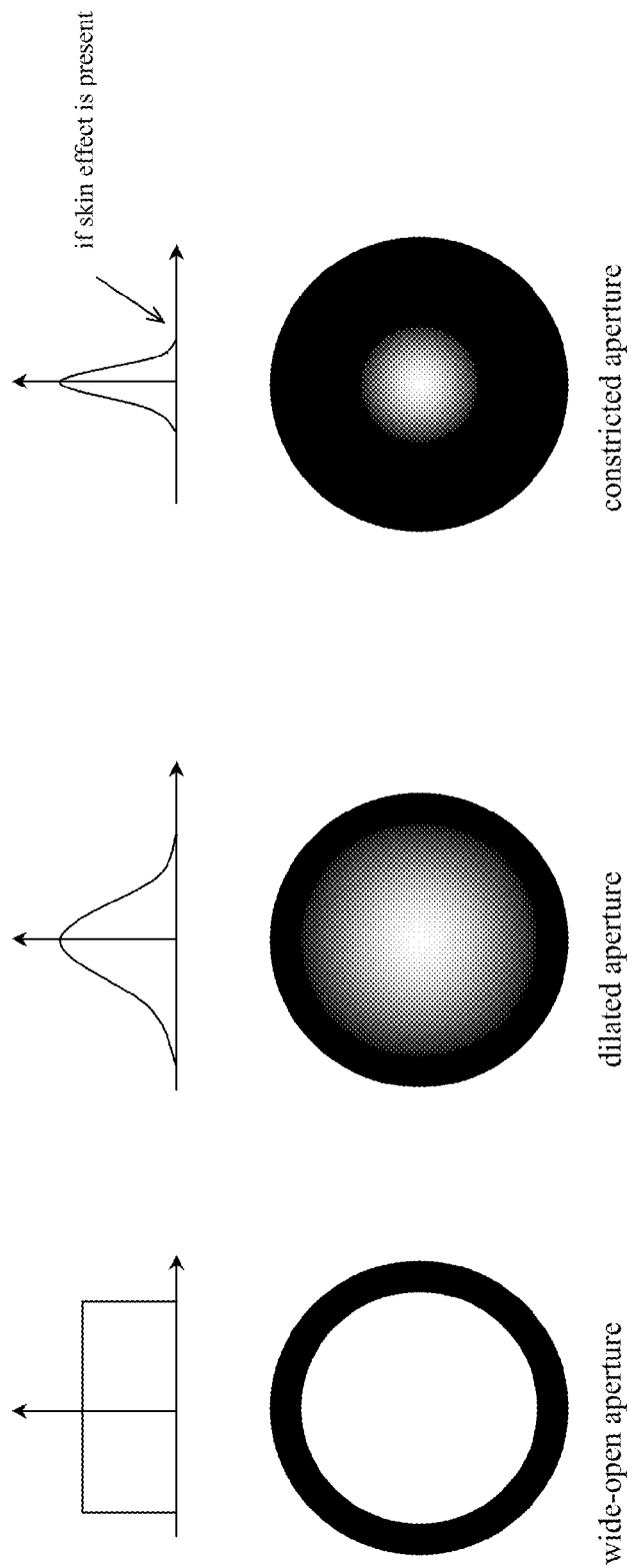
FIG. 3 illustrates operation of an adjustable apodized aperture designed in accordance with embodiments of the invention.

The width of the Gaussian changes as the absorption through the photochromic material changes. When the photochromic material is not excited, the material is clear and the aperture is wide open. As the photochromic material gets darker with more excitation the aperture goes from a dilated state to a constricted state as shown in FIG. 3.

As shown in FIG. 2a, an adjustable apodized lens aperture may be constructed in accordance with specific embodiments of the invention as a plano-plano element 200 by mounting plano-plano element 204 to plano-convex element 206 with a photochromic material 202. Plano-plano element 200 provides an adjustable apodized lens aperture that allows light ray 208 to pass without deviation. According to one embodiment, elements 202, 204, and 206 have the same refractive index. In another embodiment, the three elements do not have the same index of refraction, therefore creating an adjustable apodized lens aperture with optical power. According to some embodiments, plano-convex element 206 may be replaced with elements having other shapes with desirable optical properties. For example, a substantially spherical element might be employed. Other alternatives will be apparent to those of skill in the art.

Figure 4:
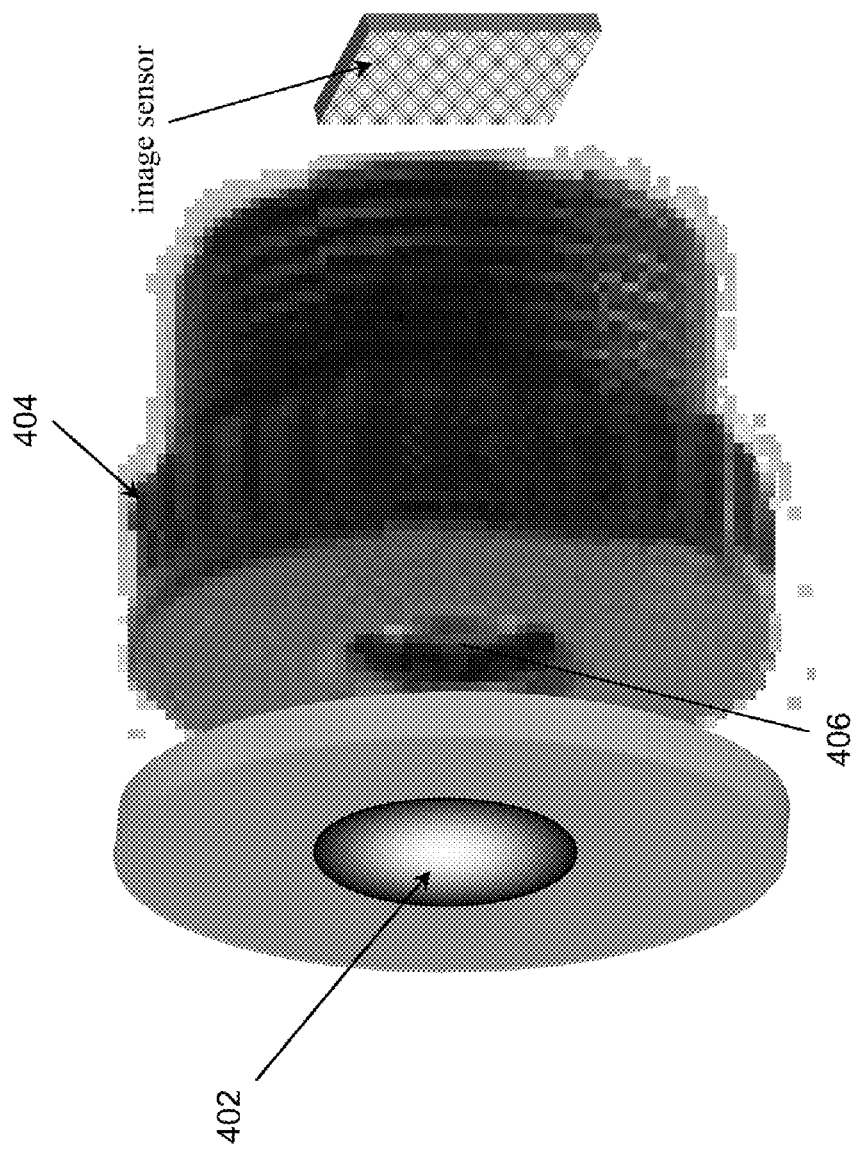
FIG. 4 shows an example of a lens system designed according to a specific embodiment of the invention.

As shown in FIG. 4, a plano-plano element 402 constructed in accordance with an embodiment of the invention may be placed in the optical path of a lens 404, preferably near its entrance pupil 406. Many cell phone camera lens systems have an entrance pupil located very near the first element in the lens system. This provides a convenient location for an adjustable apodized lens aperture implemented according to the present invention.

Placement of an adjustable apodized lens aperture in front of a lens may result in significant advantages. For example, UV rays from ambient light reaching the aperture are unobstructed by lens elements. In addition, the aperture does not introduce vignetting since it is close to the lens entrance pupil. Moreover, the aperture can act as a protective window, replacing the traditional cover glass often present in front of cell phone camera modules.

The reason many lens systems have their entrance pupil very near their first element relates to compatibility with CMOS image sensors. Unlike CCD image sensors, CMOS image sensors have many metal layers over the pixel area and therefore require rays impinging on the pixels to be close to normal incidence. Typically, in order to make sure that the chief ray angle of a lens does not exceed 20 degrees, the entrance pupil must be designed to be as close as possible to the object focal plane. Ideally, if the entrance pupil was in the object focal plane, the exit pupil would be at infinity and the lens would therefore be perfectly telecentric in the image plane.

Some embodiments of the invention are characterized by the advantage that they can be implemented without having to redesign the lens system, i.e., to bring its entrance pupil to the front, or to change the lens manufacturing process, i.e., to incorporate the adjustable apodized aperture inside into the pupil plane. That is, because most cell phone camera lenses already have their entrance pupil in front of them (i.e., rather than inside of them), adjustable apodized apertures designed according to some embodiments of the invention can be easily placed in front of existing lens systems in the final cell phone assembly process, or even sold as an after-market accessory (i.e., a replacement for the protective cover glass).

In another embodiment illustrated in FIG. 2b, the plano-plano and plano-convex elements of the embodiment of FIG. 2a are not present. That is, an adjustable apodized lens aperture may be constructed as a single element of photochromic material such as, for example, a plano-concave element 220, or a bi-concave element (not shown). Such embodiments achieve the variable thickness of the photochromic material without requiring a substrate.

According to additional embodiments, it is possible to achieve adjustable apertures having other apodization characteristics than a Gaussian radial transmission curve by changing the shape of the plano-convex element. One such example is illustrated in FIG. 2c which shows a plano-plano element 250 constructed by mounting plano-plano element 254 to truncated plano-convex element 256 with photochromic material 252. As with other embodiments, plano-plano element 250 provides an adjustable apodized lens aperture that allows light ray 258 to pass without deviation. According to some embodiments, truncation of the plano-convex element allows for an upper limit in the aperture adjustment. This is useful, for example, if a maximum effective f number is desired irrespective of the excitation intensity. For instance, it may be desirable to cap the upper limit of the f number range to f/16 for diffraction reasons. Although the aperture is no longer purely Gaussian, the beneficial effects of the gradual aperture transition are still present As with the embodiment of FIG. 2a, elements 252, 254, and 256 may all have the same refractive index or, alternatively, different indices of refraction, resulting in an aperture with optical power.

According to a second class of embodiments, an adjustable apodized lens aperture is achieved by varying the concentration or effectiveness of photochromic dye in the material from which the aperture is constructed. That is, instead of varying the thickness of the photochromic material, the active concentration or effectiveness of the photochromic dye in the host material may be varied in a number of different ways. In one embodiment, the photochromic dye is dissolved uniformly in the host material and a small amount of chemical inhibitor is dropped at the center of the aperture. The radial diffusion of the chemical inhibitor causes local deactivation of dye molecules and the resulting concentration of active photochromic dye left in the host material follows an apodized characteristic such as, for example, an inverse Gaussian distribution.

Figure 5:
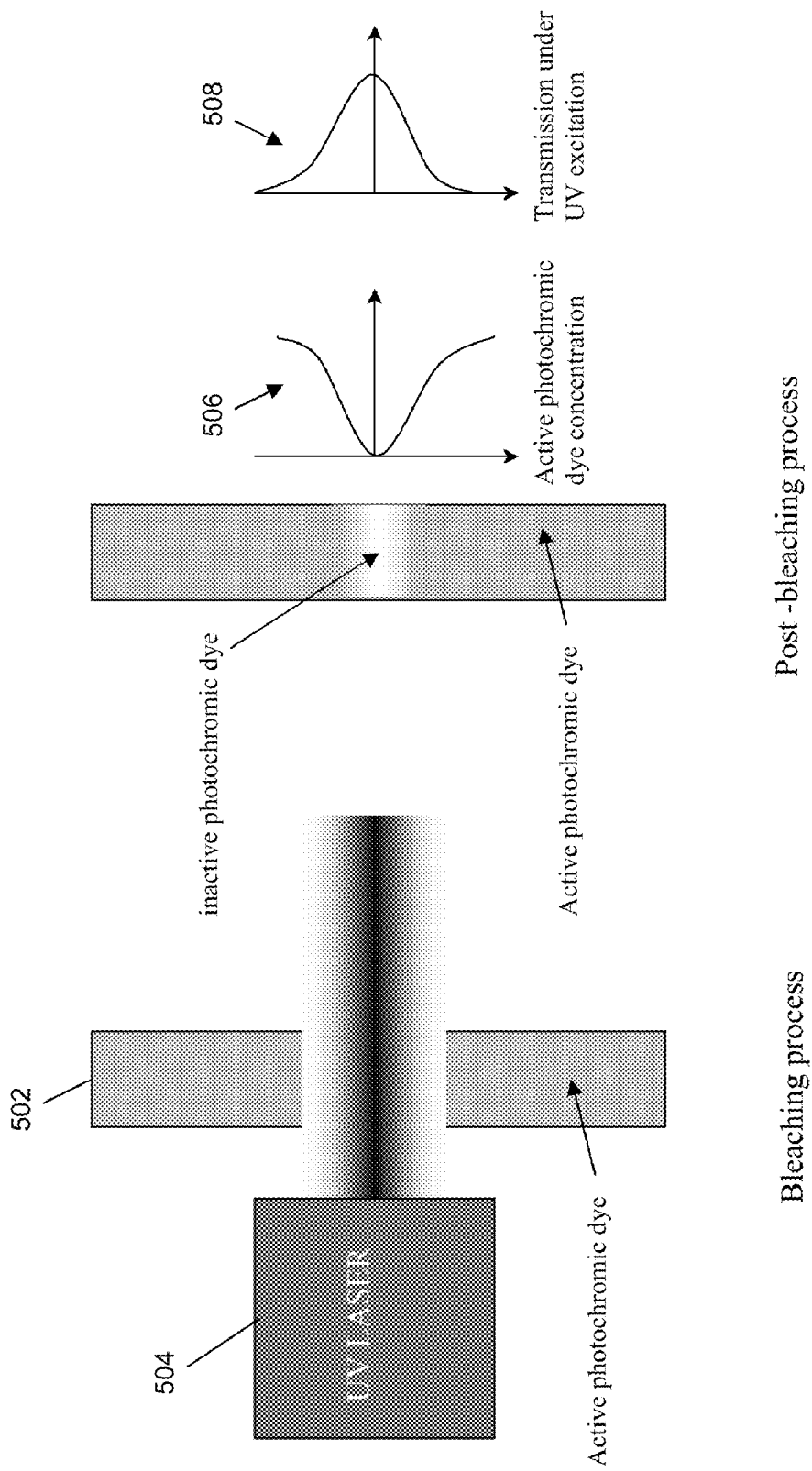
FIG. 5 illustrates "bleaching" of photochromic dye according to a specific embodiment of the invention.

According to another approach the photochromic dye molecules are locally "bleached." That is, although photochromic dye molecules do not degrade with the number of excitation cycles, their lifetime depends on their cumulative UV exposure, the stabilizers used, and choice of host material. When exposed to a high UV exposure photochromic dye molecules "fatigue" and no longer darken. Therefore, according to a specific embodiment, photochromic dye molecules are locally rendered inactive by fatiguing them prematurely with a very strong UV exposure. According to one such embodiment illustrated in FIG. 5, a photochromic dye is uniformly dissolved in host material (502) and the center of the aperture is exposed during fabrication to a very strong UV Gaussian beam (e.g., UV laser 504). The UV beam destroys the photochromic dye molecules along an inverse Gaussian distribution (506). When excited with UV light, the remaining photochromic dye molecules create an apodized aperture with a Gaussian distribution (508).

Figure 6A:
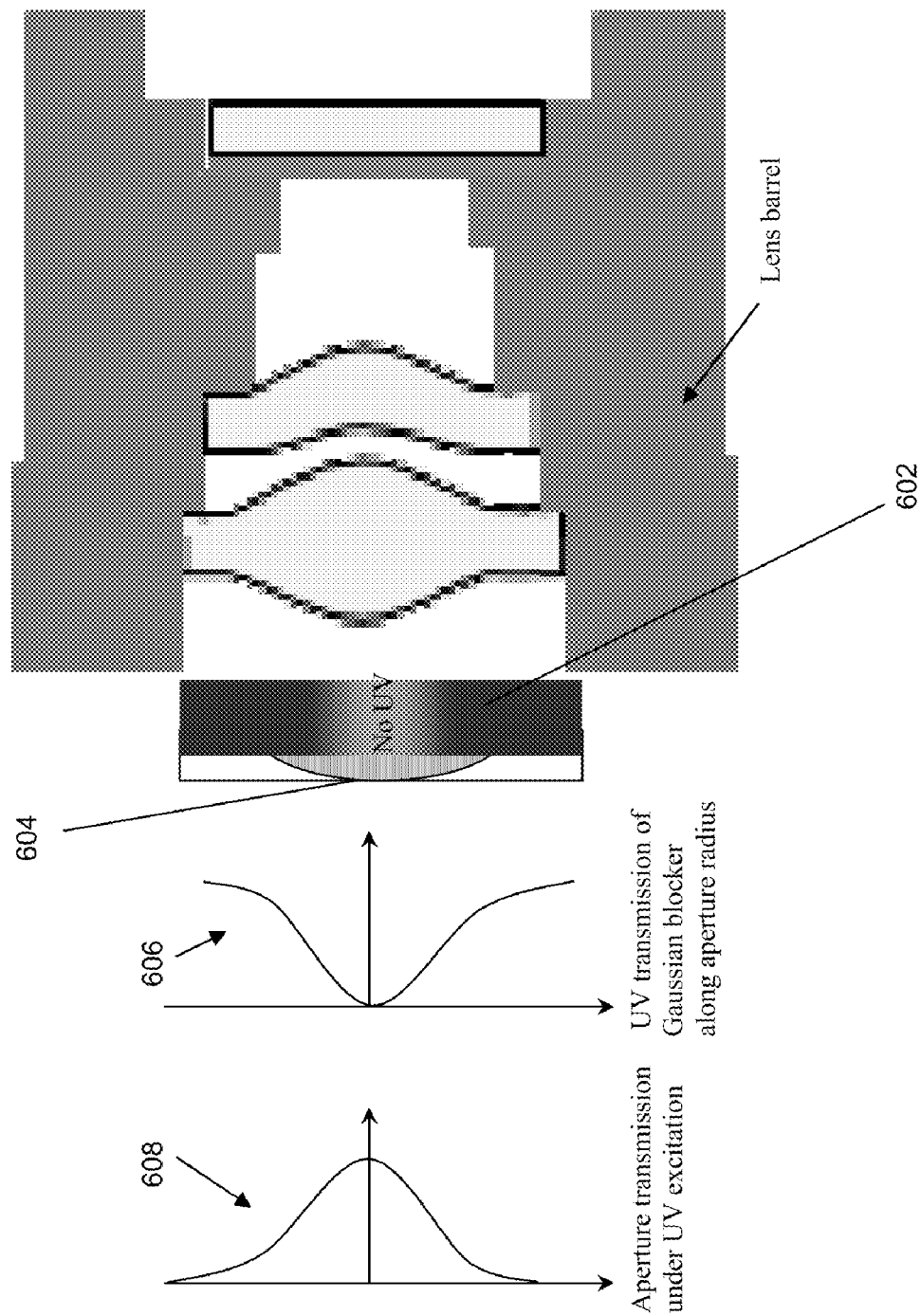

According to a third class of embodiments, an adjustable apodized lens aperture is achieved by varying excitation of photochromic dye in the material from which the aperture is constructed. That is, instead of varying the thickness of the photochromic material or the active concentration or effectiveness of the photochromic dye as described above, the excitation of the photochromic material may be varied in a number of different ways. In one embodiment illustrated in FIG. 6a, photochromic dye is dissolved uniformly in a host material (602). The UV excitation is locally blocked from impinging on the face of photochromic material 602 by a UV blocker 604 which, according to one embodiment blocks UV light in an inverse Gaussian distribution (606). This results in a corresponding Gaussian aperture transmission characteristic (608).

In another embodiment illustrated in FIG. 6b, photochromic dye is dissolved uniformly in a host material along with an optional strong UV absorber (652). The UV excitation is blocked from impinging on the face of aperture 652 by UV blocking material 654 and can only reach it from its edge, i.e., along the circumference. An annular UV illumination (656), also referred to as a UV ring light, may be facilitated, for example, by ambient light, one or more UV LEDs, or both. Although the photochromic material of aperture 652 has uniform thickness and uniform dye concentration, its UV excitation exponentially decreases toward the center of aperture 652 as it gets blocked by the UV absorber.

According to various embodiments, the UV absorber can be the photochromic material itself (if it has strong enough UV absorption), or a separate UV absorbing material added to the photochromic material in the appropriate concentration. In the excitation process, UV light is in fact absorbed by the photochromic material. If this absorption is strong enough, it can be sufficient to decrease UV excitation towards the center of the aperture. This phenomenon is called the "skin effect" since it refers to the effect where only the outer portion of the photochromic material (i.e., the skin) is excited, and the deeper portions of photochromic material are not excited (or excited to a lesser extent) since all the UV excitation is inhibited by the skin.

The skin effect helps in the implementation of this class of embodiments whereas it may actually slightly impede the first and second classes of embodiments by limiting the optical density at the outer edge of the apertures. It is not critical to the present invention for the aperture transmission along its radius to be purely Gaussian and it is inconsequential if it reaches a clipping point (low limit) before the aperture's edge (see FIG. 3). The skin effect is mitigated when using photochromic materials in gel or liquid form (because of Brownian motion) and amplified when using photochromic materials in solid form. Various embodiments employing annular illumination of an aperture constructed in accordance with the invention are described below.

Figure 7A:
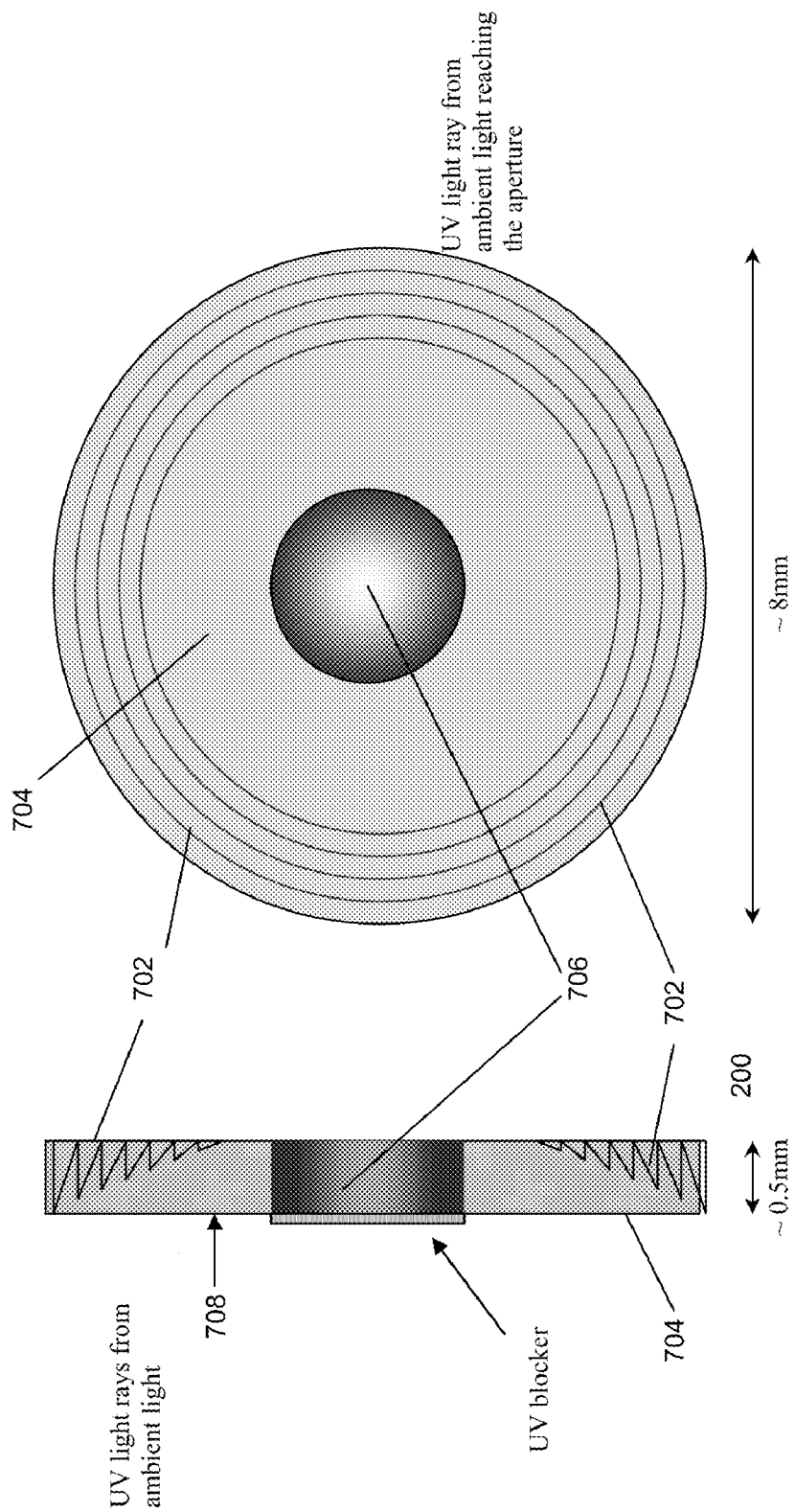
FIGS. 7a and 7b are edge-on and front views of examples of adjustable apodized apertures designed in accordance with specific embodiments of the invention.
Figure 7B:
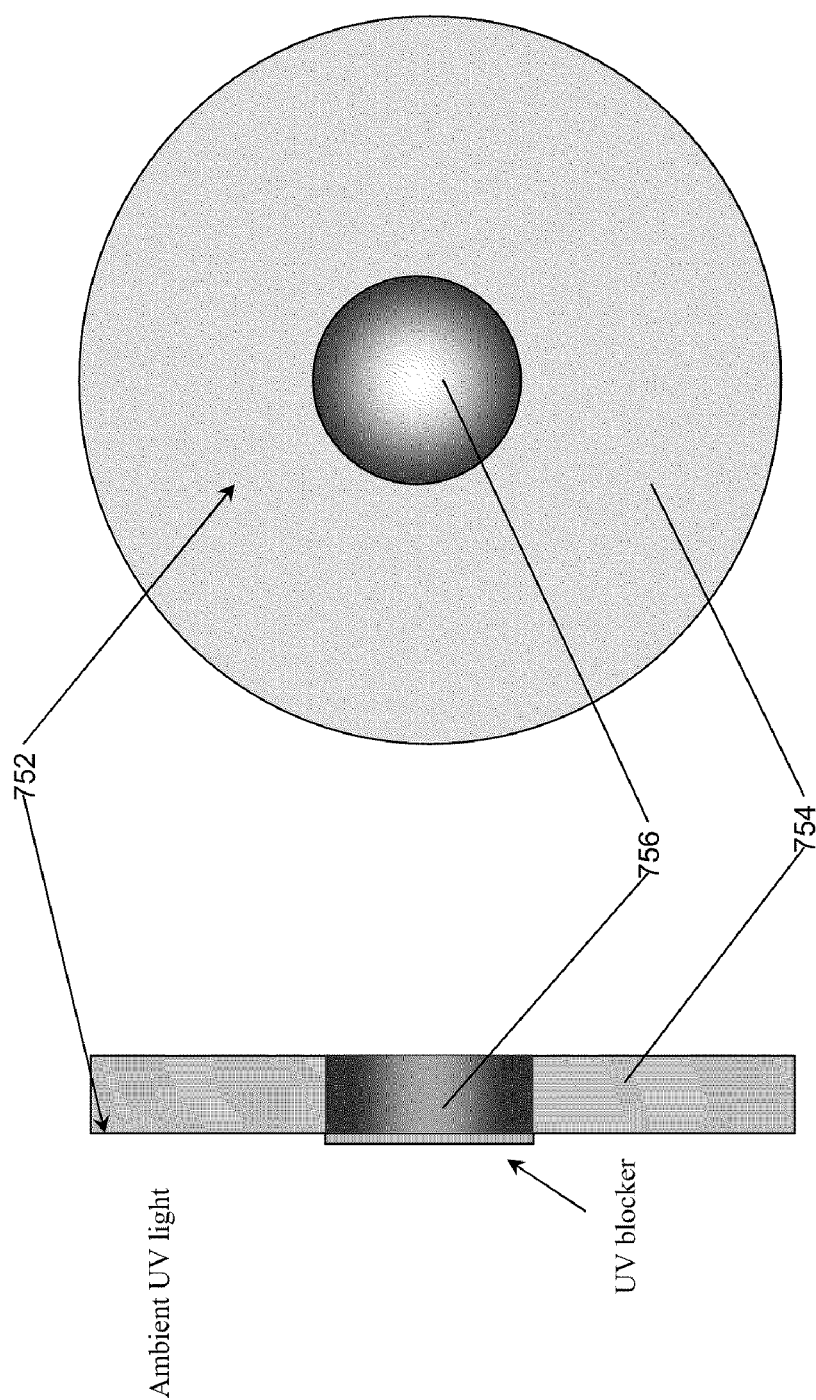

FIGS. 7a and 7b illustrate examples of embodiments which employ ambient light (e.g., daylight) as the excitation source for annular illumination of an aperture formed using photochromic material. In the embodiment shown in FIG. 7a, Fresnel-like groves 702 are molded on the rear surface of a UV-transparent annular substrate 704 which is meant to collect ambient UV radiation and redirect it towards a central disk-shaped aperture 706 formed from a photochromic material shielded by a UV blocker (e.g., a UV cut-off filter by reflective or absorptive means). The grooves are designed to reflect ambient UV light towards the aperture's circumference through internal reflections (e.g., rays 708). In the embodiment shown, the aperture is a few millimeters (e.g., 2-3 mm) in diameter (i.e., to match the typical lens full aperture). Substrate 704, which acts as a UV light "collector," is approximately 8 mm in diameter (i.e., to match the typical camera module footprint).

According to an alternate embodiment shown in FIG. 7b, diffusing grooves 752 are molded on the front surface of a UV-transparent annular substrate 754 which is meant to collect ambient UV radiation and redirect it towards a central disk-shaped aperture 756 formed from photochromic material shielded by a UV blocker. The grooves are designed to diffuse ambient UV light towards the aperture's circumference in a manner similar to a light shaping diffuser such as the ones employed by Physical Optics Corporation of Torrance, Calif. Light shaping diffusers are holographically recorded, randomized surface relief structures that enable high transmission efficiency and controlled angular distribution while providing high quality homogenized light. The precise surface relief structures provide controlled angular divergence, emulating a negative lens. Unlike light shaping diffusers which feature high transmission, the proposed diffusing substrate exhibits low transmission since the UV light is meant to be trapped inside of it. The angular divergence is such that the UV light is diffused towards the aperture either directly or by internal reflection on the back surface of the substrate.

Figure 8A:
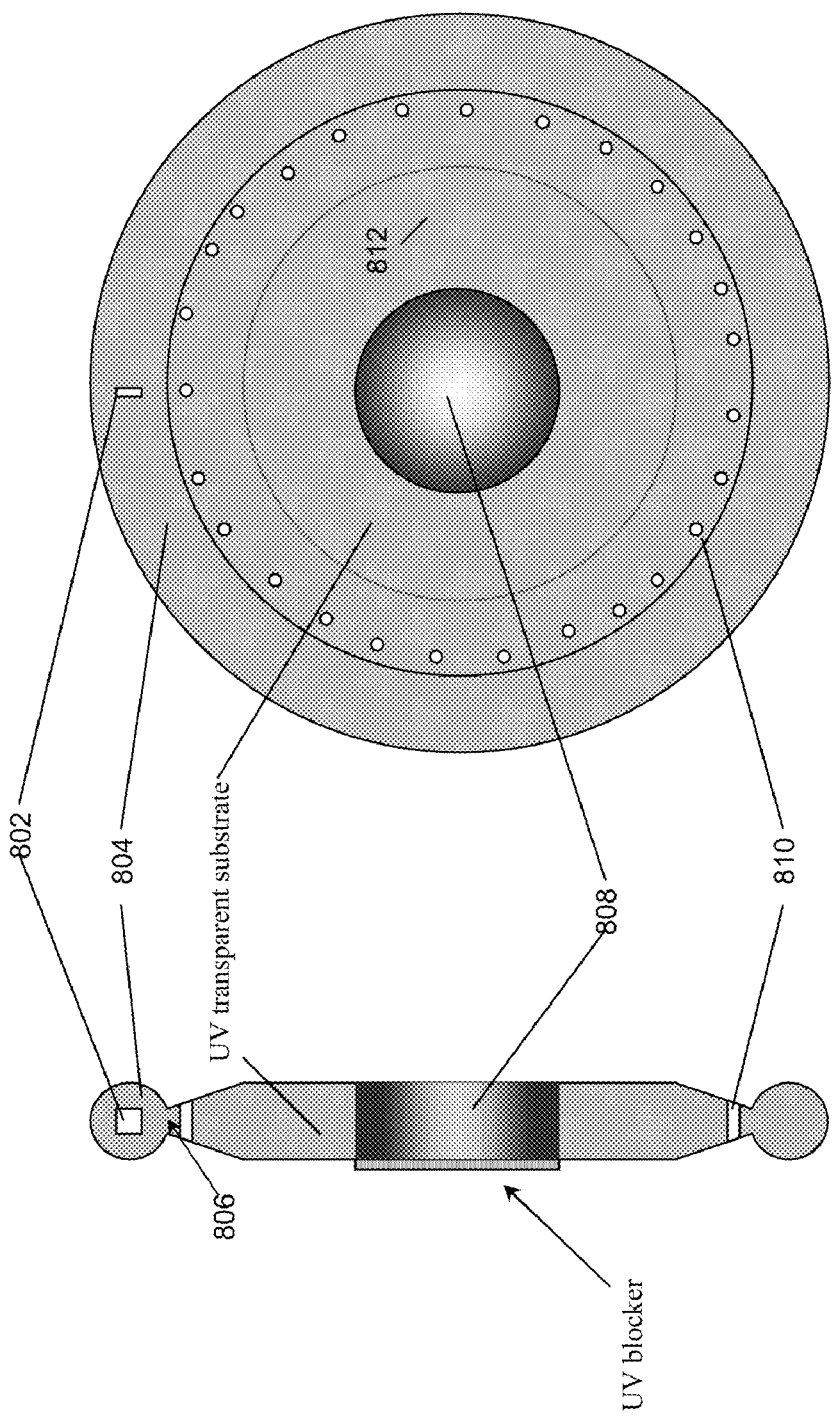
FIGS. 8a and 8b are edge-on and front views of examples of adjustable apodized apertures designed in accordance with specific embodiments of the invention.
Figure 8B:
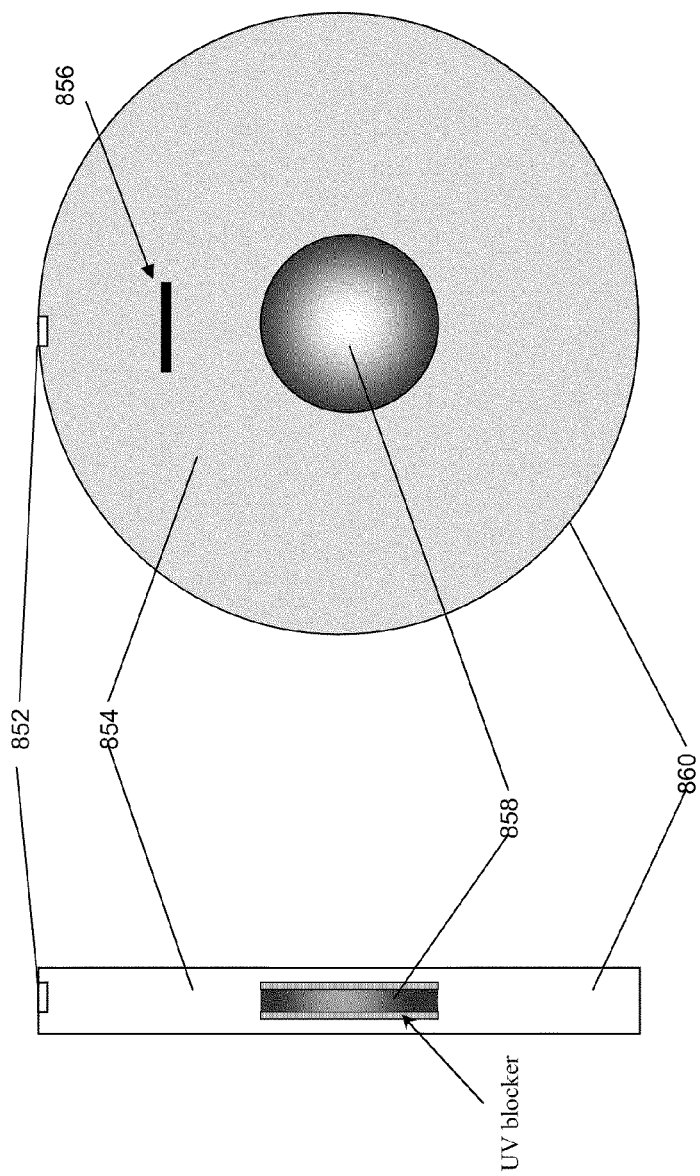

As mentioned above, embodiments are contemplated in which one or more UV LEDs are employed as the excitation source(s) for annular illumination of an aperture formed using photochromic material. As will be understood, this may be accomplished using multiple UV LEDs configured in a ring around the circumference of the aperture. According to some embodiments, as few as one UV LED may be employed to provide this excitation. FIGS. 8a and 8b illustrate examples of such embodiments in which a single LED is placed judiciously to create a uniform excitation at the periphery of the aperture.

In the embodiment shown in FIG. 8a, a single UV LED 802 is placed at the entrance of a leaky toroidal waveguide 804. Leakage path 806 is provided to let some of the UV light trapped in toroidal waveguide 804 reach the central disk-shaped aperture 808 formed from photochromic material shielded by a UV blocker. Small holes 810 in the substrate close to leakage path 806 create hollow cylindrical lenses which redirect the leakage UV light toward aperture 808 (e.g., light ray 812. This optical configuration achieves the desired uniformity while maintaining simplicity and affordability (i.e., only one LED).

In the embodiment of FIG. 8b, a single UV LED 852 is placed at the entrance of a UV transparent substrate 854 acting as an integrating cylinder. A baffle 856 is provided to block UV LED light from directly reaching aperture 858. The surface of the cylinder circumference of substrate 854 is designed to diffuse UV light. According to a specific embodiment, diffracting grooves 860 are provided to diffract the UV light back into the substrate, e.g., like a grating, as opposed to alternate embodiment which may employ an isotropic diffuser, e.g., Barium sulfate. Grooves 860 act like a unidirectional diffuser, i.e., no diffusion in the groove planes, thus maximizing the amount of UV light trapped in substrate 854.

The embodiments described above allow for an adjustable lens aperture that is inexpensive, low-profile, and low power, and can therefore successfully address the cell phone camera module market. Because of their apodization, the proposed adjustable lens apertures are also less sensitive to diffraction effects than mechanical irises. Diffraction-induced resolution loss is a serious drawback of mechanical irises, especially at small aperture settings (i.e., high f-numbers, e.g., f/5.6 or higher), and when the image sensor's pixel size approaches the wavelength of the received light (e.g., 2 µm pixel size vs. 0.55 µm wavelength).

Figure 9:
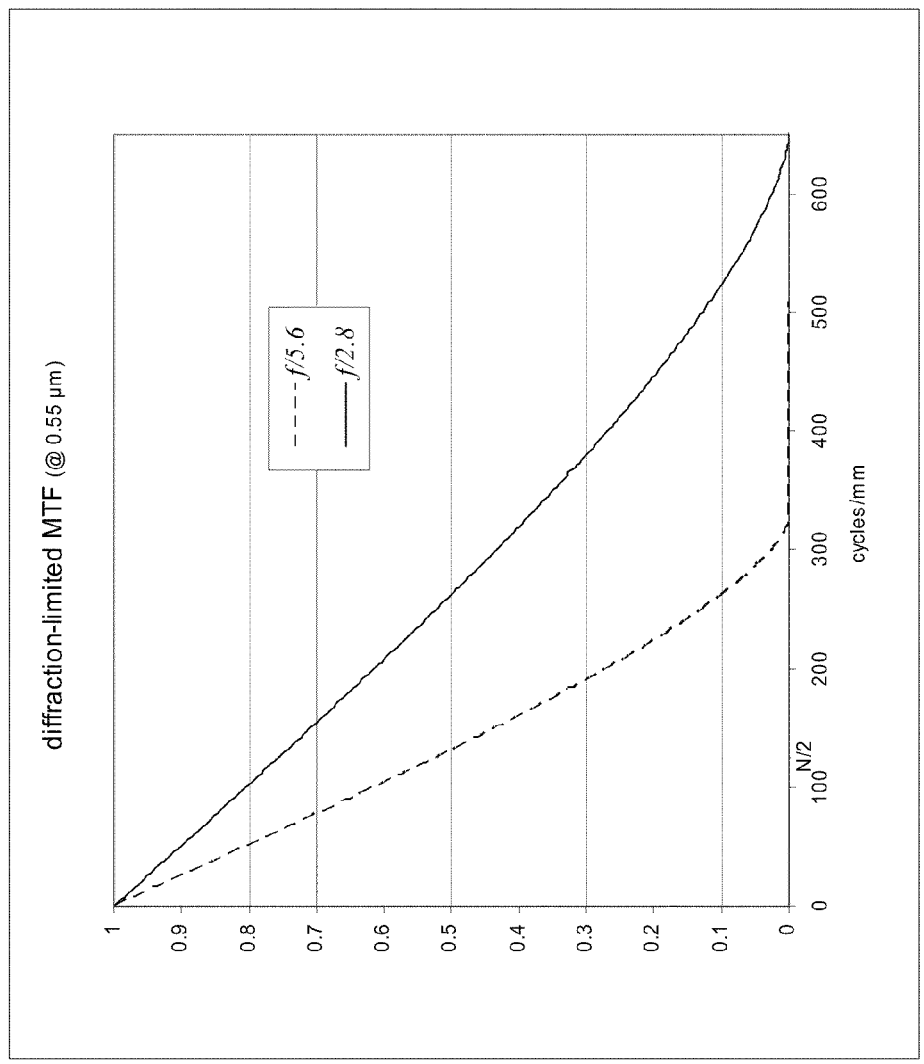
FIGS. 9, 10, and 12 show diffraction-limited modulation transfer functions for conventional apertures and apertures designed in accordance with embodiments of the invention.

Diffraction-induced resolution loss is well illustrated by the diffraction-limited modulation transfer function (MTF). The diffraction-limited MTF describes an ideal lens with no aberrations and represents the theoretical upper limit of the contrast of any real lens. FIG. 9 shows the diffraction-limited MTF of a lens with a conventional circular aperture at f/2.8 and f/5.6. The spatial frequency of interest is 125 cycles/mm because it corresponds to half the Nyquist frequency of an image sensor with a 2 µm pixel size. The Nyquist frequency is the maximum spatial frequency which can be faithfully reproduced by the image sensor. In the common case of a color image sensor with a Bayer pattern (i.e., 50% green, 25% red, and 25% blue), half the Nyquist frequency (N/2) represents the maximum spatial frequency of the green channel.

In the current cell phone camera module market, 70% is an acceptable value for the lens MTF at N/2 in the center of the field of view. This value can be achieved if the lens has an f/2.8 aperture since, as illustrated in FIG. 9, the theoretical upper limit is 75%. However, this value cannot be reached if the lens has an f/5.6 aperture since the theoretical upper limit is only 52%.

Figure 10:
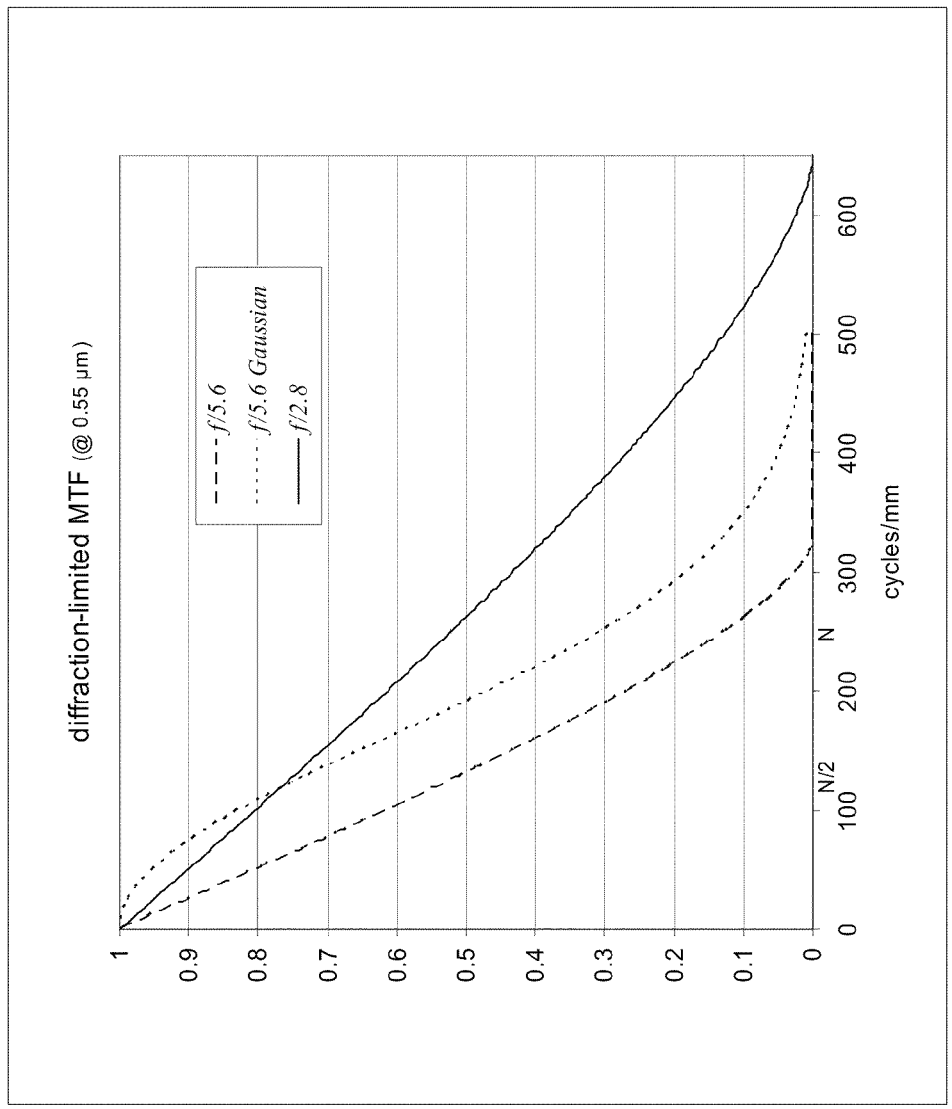

FIG. 10 shows the diffraction-limited MTF of a lens with a conventional circular aperture (f/2.8 and f/5.6) as well as the diffraction-limited MTF of a lens with an f/5.6 equivalent apodized Gaussian aperture, i.e., an apodized Gaussian aperture designed according to an embodiment of the invention which lets the same amount of light through the lens as a conventional f/5.6 circular aperture. It is clear from FIG. 10 that the MTF of a lens with an f/5.6 Gaussian aperture is much higher than a conventional f/5.6 lens and is fact even higher than a conventional f/2.8 lens for spatial frequencies below N/2. This validates that, with embodiments of the present invention, the lens aperture can be reduced so as to increase depth of field without sacrificing sharpness.

The apodization technique employed by specific embodiments of the invention brings yet another advantage over conventional apertures in that it helps increase the image contrast at low spatial frequencies and decreases it at high spatial frequencies, thus reducing Moiré effects. This advantage is well illustrated in FIG. 10. As shown, for spatial frequencies below N/2, the MTF of an f/5.6 Gaussian aperture lens is higher than for a conventional f/2.8 lens but for spatial frequencies above N/2, it is significantly lower. At Nyquist frequency N, the MTFs are 31% and 52%, respectively. This is a particularly useful feature in terms of reducing unwanted aliasing artifacts (e.g., Moiré effects).

Conventional lens systems create difficult tradeoff issues between MTF and aliasing. That is, in conventional systems, the MTF is maximized at half the Nyquist frequency in order to increase image contrast. However, it is also maximized at the Nyquist frequency and above, thus creating objectionable aliasing artifacts. Costly and cumbersome optical components (e.g., birefringent optical low pass filters) must be added to reduce such artifacts. By contrast and as illustrated in FIG. 10, apodized lenses can be optimized for high MTF at low spatial frequencies and relatively lower MTF at higher spatial frequencies.

Figure 11:
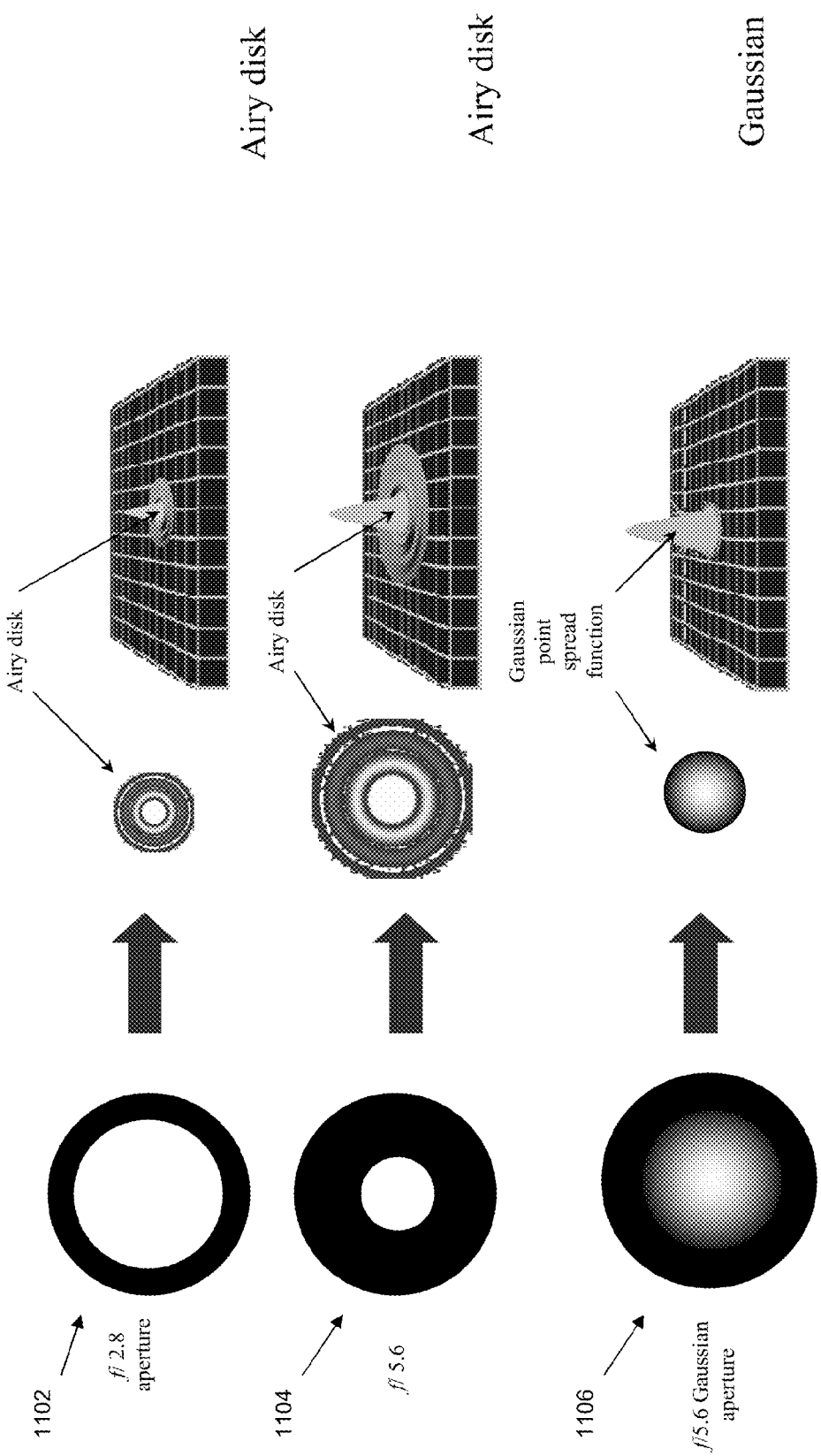
FIG. 11 show diffraction patterns for conventional apertures and apertures designed in accordance with embodiments of the invention.

Another advantage of having an apodized aperture is the ability to reduce unwanted artifacts caused by diffraction effects, e.g., rings and halos. Rings and halos are particularly objectionable because they can create color artifacts. They are most visible around bright spots. The image of a bright spot through a diffraction-limited lens with a conventional circular aperture exhibits rings and halos. These rings and halos are caused by the diffraction of the light through the aperture. As shown in FIG. 11, conventional circular apertures, e.g., 1102 and 1104, generate a diffraction pattern known as the Airy disk which is characterized by a center circular spot with multiple rings of decreasing brightness. By contrast, the diffraction pattern created by a Gaussian aperture 1106 is a Gaussian spot, i.e., a bell-shaped spot with no objectionable rings and halos. The mathematical explanation is that the Fourier transform of a Gaussian function is also a Gaussian function.

In addition to the advantages of apodization, the ability to adjust the aperture provides further advantage of the present invention. In the case of current cell phone camera modules, a difficult compromise must be made to determine the f-number of the fixed-aperture lens (typically f/2.8). At f/2.8, the lens is too "fast" to produce images with acceptable depth of field (auto-focus needed) and too "slow" to produce good images in low light level conditions. To obtain reasonable depth of field, an f/5.6 aperture would be preferable (as long as it does not introduce diffraction effects). To obtain good images in low light level conditions, an f/1.4 aperture would be preferable.

As described herein, an adjustable-aperture lens system can be manufactured easily and inexpensively by placing the adjustable aperture enabled by embodiments of the present invention in front of a conventional lens. The adjustable aperture helps increase the depth of field (e.g., by closing down the lens aperture to f/5.6 or above when needed), and also helps increase camera sensitivity (by opening the lens to its full aperture, e.g. f/1.4 or below). Although at f/1.4, the lens MTF and depth of field are not nearly as good as at f/2.8, the camera module sensitivity is increased by a factor of 4. This is particularly important for camera modules with small-pixel image sensors in low light level conditions. In these "photon-starved" conditions, the image signal-to-noise ratio is marginal because of relatively high photon noise and image sensor noise (also referred to as "salt and pepper noise"). Poor signal-to-noise ratio gives the image an apparent fuzziness (i.e., a lack of sharpness), even with a high MTF lens. This is why increasing the lens speed (and thus the signal-to-noise ratio) has a far greater impact on image quality than the lens MTF.

Figure 12:
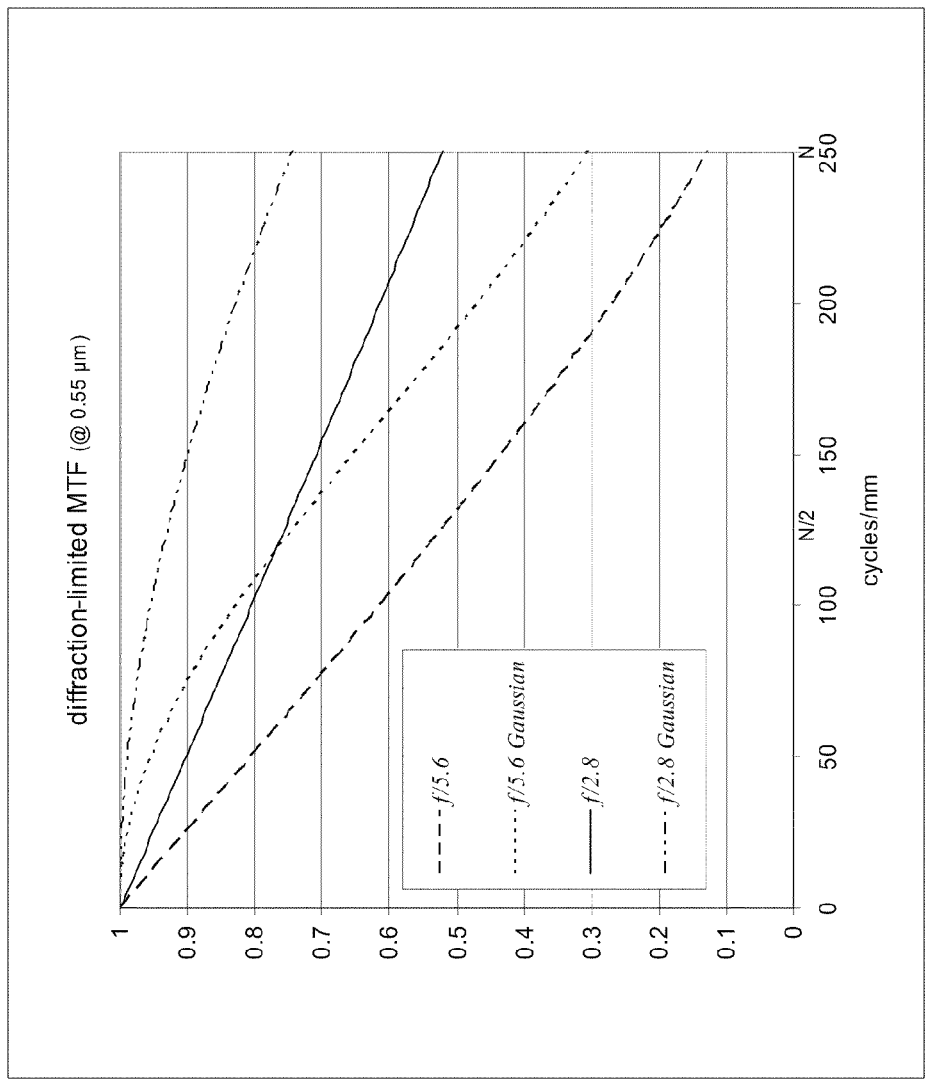

Current camera module lenses are limited in terms of image quality by aberrations as well as diffraction. As lens manufacturing technology improves, lens aberrations can be further reduced and may, in the future, allow for diffraction-limited performance down to f/1.4. In the event that such improvements are realized, embodiments of the present invention may prove even more desirable. In its wide-open state, an adjustable apodized aperture designed according to embodiments of the invention allows for optimal low light level imaging. As illustrated in FIG. 12, as the photochromic material darkens to create an f/2.8 equivalent apodized Gaussian aperture, the MTF can approach 95% at N/2. This is substantially better than the 75% MTF at N/2 for a conventional f/2.8 lens with a circular aperture. As the photochromic material further darkens to create an f/5.6 equivalent apodized Gaussian aperture, the MTF stays high while the depth of field increases significantly. No auto-focus is necessary and no compromise is made to the image quality. Thus, unlike with conventional lenses, the camera performance at low light levels is not achieved at the expense of its performance at high light levels.

As mentioned above, according to various embodiments of the invention, the aperture adjustment achieved through excitation of the photochromic material can be controlled either by ambient light (e.g., like the human eye's iris), or electrically using a UV source (e.g., one or more UV LEDs). In embodiments which employ ambient light aperture control, certain graphics and icons may be placed at the periphery of the aperture to indicate to the user the actual ambient light level. For example, an area outside the aperture can be created with photochromic material in front of a red-colored icon. When the light level is insufficient for optimal image quality, the photochromic material is in its clear state (i.e. transparent) and exposes the red-colored icon. Alternatively, a colored photochromic material (e.g. green photochromic dye) can be placed near the aperture to indicate when the ambient level is sufficient for optimal image quality.

In embodiments employing electrical aperture control, the UV light can come either from a dedicated UV LED (e.g., as shown in FIGS. 8a and 8b), or be diverted from the UV source used in the flash/projector unit. That is, many digital cameras and cell phones now feature a flash/projector unit which includes a high brightness white LED. The white LED is in fact a UV LED with a white phosphor coating over it. According to some embodiments, a small amount of UV light can be diverted from this LED, e.g., with a plastic optical fiber, to provide the aperture excitation.

While the invention has been particularly shown and described with reference to specific embodiments thereof, it will be understood by those skilled in the art that changes in the form and details of the disclosed embodiments may be made without departing from the spirit or scope of the invention. For example, although the foregoing description makes references to applications of the present invention to cell phone camera modules, adjustable apodized lens apertures designed in accordance with the invention may be employed to implement lens systems for use in a wide variety of applications. That is, in addition to enabling improved cell phone camera modules, the present invention may be employed to provide low cost lens systems and cameras for a variety of uses. For example, computer cameras (also known as webcams), security cameras, and cameras installed in automobiles (which all need to operate under a very wide range of illumination).

Moreover, for some embodiments, it is desirable to select a photochromic material for the aperture such that transmission spectra of the aperture is as uniform as possible across the spectrum of visible light. However, embodiments are contemplated in which the transmission spectra varies for different wavelengths of light, i.e., different effective apertures for different portions of the visible light spectrum.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. An optical element comprising a photochromic material, the photochromic material being configured such that when the photochromic material is exposed to excitation energy an apodized aperture operable to transmit visible light through the optical element is formed, wherein variance of the excitation energy causes corresponding adjustment of the apodized aperture, and wherein the apodized aperture is characterized by a Gaussian radial transmission curve.

2. The optical element of claim 1 wherein the photochromic material includes a photochromic dye which is substantially uniformly distributed throughout the photochromic material, and wherein a thickness of the photochromic material increases along a radius of the apodized aperture.

3. The optical element of claim 2 wherein the photochromic material is configured as one of a plano-concave element or a bi-concave element.

4. The optical element of claim 1 further comprising an ultraviolet (UV) blocking element configured to inhibit UV energy from impinging on at least a portion of a front surface of the photochromic material through which the visible light reaches the apodized aperture.

5. The optical element of claim 4 wherein the UV blocking element has a transmission characteristic for UV energy which increases along a radius of the apodized aperture.

6. The optical element of claim 4 wherein the UV blocking element blocks substantially all UV energy from impinging on the front surface of the photochromic material.

7. The optical element of claim 6 wherein the photochromic material includes a photochromic dye which is substantially uniformly distributed throughout the photochromic material, and wherein the photochromic material comprises a UV energy absorber, the optical element further comprising at least one excitation component configured to facilitate transmission of UV energy through an edge of the photochromic material, the UV energy absorber being operable to interact with the UV energy to define the apodized aperture.

8. The optical element of claim 7 wherein the at least one excitation component comprises at least one active source of UV energy.

9. The optical element of claim 8 wherein the at least one active source of UV energy comprises a plurality of UV light emitting diodes configured in a ring around the edge of the photochromic material.

10. The optical element of claim 8 wherein the at least one active source of UV energy comprises a single UV light emitting diode, and wherein the at least one excitation component further comprises an integrating cylinder for dispersing the UV energy around the edge of the photochromic material.

11. The optical element of claim 8 wherein the at least one active source of UV energy comprises a single UV light emitting diode, and wherein the at least one excitation component further comprises a toroidal waveguide for dispersing the UV energy around the edge of the photochromic material.

12. The optical element of claim 7 the at least one excitation component is configured to transmit ambient light to the edge of the photochromic material.

13. The optical element of claim 12 wherein the at least one excitation component comprises a substrate surrounding the photochromic material having grooves formed in a surface therefore for dispersing the UV energy around the edge of the photochromic material.

14. The optical element of claim 7 wherein the UV energy absorber comprises an additional material distinct from the photochromic dye.

15. The optical element of claim 7 wherein the UV energy absorber comprises the photochromic dye.

16. The optical element of claim 1 wherein the photochromic material comprises one of glass, plastic, liquid, gel, or solid.

17. The optical element of claim 1 wherein the photochromic material includes a photochromic dye which is distributed throughout the photochromic material such that an active concentration of the photochromic dye increases along a radius of the apodized aperture.

18. The optical element of claim 17 wherein the active concentration of the photochromic dye relates to an inactive concentration of the photochromic dye which corresponds to dye molecules deactivated with a chemical inhibitor.

19. The optical element of claim 17 wherein the concentration of the photochromic dye relates to an inactive concentration of the photochromic dye which corresponds to dye molecules fatigued by exposure to ultraviolet light.

20. An optical element comprising a photochromic material, the photochromic material being configured such that when the photochromic material is exposed to excitation energy an apodized aperture operable to transmit visible light through the optical element is formed, wherein variance of the excitation energy causes corresponding adjustment of the apodized aperture, wherein the photochromic material includes a photochromic dye which is substantially uniformly distributed throughout the photochromic material, and wherein a thickness of the photochromic material increases along a radius of the apodized aperture, the optical element further comprising a plano-plano element and a plano-convex element, a convex surface of the plano-convex element having a point of contact with a flat surface of the plano-plano element, wherein the photochromic material is disposed between the plano-plano element and the plano-convex element around the point of contact such that the thickness of the photochromic material varies with the convex surface.

21. An optical element comprising a photochromic material, the photochromic material being configured such that when the photochromic material is exposed to excitation energy an apodized aperture operable to transmit visible light through the optical element is formed, wherein variance of the excitation energy causes corresponding adjustment of the apodized aperture, wherein the photochromic material includes a photochromic dye which is substantially uniformly distributed throughout the photochromic material, and wherein a thickness of the photochromic material increases along a radius of the apodized aperture, the optical element further comprising a plano-plano element and a plano-convex element, a truncated convex surface of the plano-convex element having an area of contact with a flat surface of the plano-plano element, wherein the photochromic material is disposed between the plano-plano element and the plano-convex element around the area of contact such that the thickness of the photochromic material varies with the truncated convex surface.

22. An optical element comprising a photochromic material, the photochromic material being configured such that when the photochromic material is exposed to excitation energy an apodized aperture operable to transmit visible light through the optical element is formed, wherein variance of the excitation energy causes corresponding adjustment of the apodized aperture, and wherein the photochromic material includes a photochromic dye which is distributed throughout the photochromic material such that an active concentration of the photochromic dye increases along a radius of the apodized aperture.

23. The optical element of claim 22 wherein the active concentration of the photochromic dye relates to an inactive concentration of the photochromic dye which corresponds to dye molecules deactivated with a chemical inhibitor.

24. The optical element of claim 22 wherein the concentration of the photochromic dye relates to an inactive concentration of the photochromic dye which corresponds to dye molecules fatigued by exposure to ultraviolet light.

25. An optical element comprising a photochromic material, the photochromic material being configured such that when the photochromic material is exposed to excitation energy an apodized aperture operable to transmit visible light through the optical element is formed, wherein variance of the excitation energy causes corresponding adjustment of the apodized aperture, the optical element further comprising an ultraviolet (UV) blocking element configured to inhibit UV energy from impinging on at least a portion of a front surface of the photochromic material through which the visible light reaches the apodized aperture, wherein the UV blocking element has a transmission characteristic for UV energy which increases along a radius of the apodized aperture.

26. An optical element comprising a photochromic material, the photochromic material being configured such that when the photochromic material is exposed to excitation energy an apodized aperture operable to transmit visible light through the optical element is formed, wherein variance of the excitation energy causes corresponding adjustment of the apodized aperture, the optical element further comprising an ultraviolet (UV) blocking element configured to inhibit UV energy from impinging on at least a portion of a front surface of the photochromic material through which the visible light reaches the apodized aperture, wherein the UV blocking element blocks substantially all UV energy from impinging on the front surface of the photochromic material.

27. The optical element of claim 26 wherein the photochromic material includes a photochromic dye which is substantially uniformly distributed throughout the photochromic material, and wherein the photochromic material comprises a UV energy absorber, the optical element further comprising at least one excitation component configured to facilitate transmission of UV energy through an edge of the photochromic material, the UV energy absorber being operable to interact with the UV energy to define the apodized aperture.

28. The optical element of claim 27 wherein the at least one excitation component comprises at least one active source of UV energy.

29. The optical element of claim 28 wherein the at least one active source of UV energy comprises a plurality of UV light emitting diodes configured in a ring around the edge of the photochromic material.

30. The optical element of claim 28 wherein the at least one active source of UV energy comprises a single UV light emitting diode, and wherein the at least one excitation component further comprises an integrating cylinder for dispersing the UV energy around the edge of the photochromic material.

31. The optical element of claim 28 wherein the at least one active source of UV energy comprises a single UV light emitting diode, and wherein the at least one excitation component further comprises a toroidal waveguide for dispersing the UV energy around the edge of the photochromic material.

32. The optical element of claim 27 the at least one excitation component is configured to transmit ambient light to the edge of the photochromic material.

33. The optical element of claim 32 wherein the at least one excitation component comprises a substrate surrounding the photochromic material having grooves formed in a surface therefore for dispersing the UV energy around the edge of the photochromic material.

34. The optical element of claim 27 wherein the UV energy absorber comprises an additional material distinct from the photochromic dye.

35. The optical element of claim 27 wherein the UV energy absorber comprises the photochromic dye.

* * * * *